US009766347B2

(12) United States Patent
Grasso et al.

(10) Patent No.: US 9,766,347 B2
(45) Date of Patent: Sep. 19, 2017

(54) RECEIVER FOR RECEIVING A PLURALITY OF GNSS (GLOBAL NAVIGATION SATELLITE SYSTEM) SIGNALS (71) Applicant: STMicroelectronics S.r.l., Agrate Brianza (IT)

(72) Inventors: Daniele Grasso, Mascali (IT); Giuseppe Avellone, Gravina di Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 192 days.

(21) Appl. No.: 14/839,233

(22) Filed: Aug. 28, 2015

(65) Prior Publication Data

US 2016/0103225 A1   Apr. 14, 2016

(30) Foreign Application Priority Data

Oct. 9, 2014  (IT) .............................. TO2014A0808

(51) Int. Cl.
*G01S 19/33*   (2010.01)
*G01S 19/36*   (2010.01)
*G01S 19/42*   (2010.01)

(52) U.S. Cl.
CPC .............. *G01S 19/33* (2013.01); *G01S 19/36* (2013.01); *G01S 19/423* (2013.01)

(58) Field of Classification Search
CPC .......... G01S 19/33; G01S 19/36; G01S 19/34; G01S 19/48; H04W 4/02
(Continued)

(56) References Cited

U.S. PATENT DOCUMENTS 5,389,934 A * 2/1995 Kass ...................... G01S 5/0009
342/357.34

5,485,163 A * 1/1996 Singer ................... G01S 5/0054
340/7.27
(Continued)

FOREIGN PATENT DOCUMENTS

CN   101198160 A   6/2008
CN   101281245 A   10/2008
(Continued)

OTHER PUBLICATIONS

Italian Search Report and Written Opinion, dated Jun. 17, 2015, for corresponding IT Application No. TO20140808, 10 pages.
(Continued)

*Primary Examiner* — Harry Liu
(74) *Attorney, Agent, or Firm* — Seed IP Law Group LLP (57) ABSTRACT A receiver is arranged to receive a plurality of Global Navigation Satellite System (GNSS) signals from up to four different satellite navigation systems including a GLONASS system, a BeiDou system, a GPS system, and a Galileo system. Received GNSS signals are mixed with a first local frequency signal to generate a plurality of mixed signals. The mixed signals are processed in up to three parallel branches. In a first branch, a first portion of the mixed signals are transformed by passing the first portion through a band-pass filter having a bandwidth between about 0 MHz and 46 MHz and by amplifying the filtered signals with an AGC circuit. In a second branch, a second portion of the mixed signals are transformed by rejecting image signals of the second portion with an image rejection filter and mixing image rejection filter output signals with a second local frequency signal to derive first remixed signals. In a third branch, a third portion of the mixed signals are transformed by adjusting a phase of the third portion to overlap a band of the first remixed signals. The adjusted third portion of the mixed signals and the first remixed signals are concurrently band pass filtered with a low IF filter.

20 Claims, 5 Drawing Sheets (58) Field of Classification Search
USPC .................................................. 342/357.73
See application file for complete search history.

(56) References Cited

U.S. PATENT DOCUMENTS

| | | | | |
|---|---|---|---|---|
| 2014/0333477 | A1* | 11/2014 | Lennen | G01S 19/34 342/357.65 |
| 2015/0133171 | A1* | 5/2015 | Bani Hani | H04W 4/02 455/456.6 |
| 2016/0103225 | A1 | 4/2016 | Grasso et al. | |
| 2016/0195620 | A1* | 7/2016 | Liu | G01S 19/36 342/357.72 |

FOREIGN PATENT DOCUMENTS

| | | | |
|---|---|---|---|
| CN | 102096079 | A | 6/2011 |
| CN | 102323600 | A | 1/2012 |
| CN | 202305808 | U | 7/2012 |
| CN | 103412317 | A | 11/2013 |
| CN | 104536021 | A * | 4/2015 |
| CN | 205091466 | U | 3/2016 |
| EP | 2 746 814 | A1 | 6/2014 |
| WO | 2006/086118 | A2 | 8/2006 |

OTHER PUBLICATIONS

Li et al., "Low-Power High-Linearity Area-Efficient Multi-Mode GNSS RF Receiver in 40nm CMOS," IEEE International Symposium on Circuits and Systems, Seoul, South Korea, May 20-23, 2012, 4 pages.

Maxim Integrated Products Inc., "Universal GPS Receiver," MAX2769B, Oct. 2012, 27 pages.

Norman et al., "A Quad-Constellation Monolithic GNSS Receiver," 27th International Technical Meeting of the ION Satellite Division, Tampa, FL, Sep. 8-12, 2014, pp. 280-284.

NTLab, "GLONASS/GPS/Galileo/BeiDou Multisystem Single-band Two-channel Receiver RFIC," Jan. 2013, 10 pages.

NTLab, "GPS/Galileo/BeiDou/GLONASS multisystem single-band receiver," Jan. 2013, 15 pages.

Pisoni et al., "A Galileo Hardware Receiver for the Multi-Constellation Mass Market," 27th International Technical Meeting of the ION Satellite Division, Tampa, FL, Sep. 8-12, 2014, pp. 274-279.

Qi et al., "A Dual-Channel Compass/GPS/GLONASS/Galileo Reconfigurable GNSS Receiver in 65 nm CMOS With On-Chip I/Q Calibration, " *IEEE Transactions on Circuits and Systems—I: Regular Papers* 59(8):1720-1732, Aug. 2012.

Qi et al., "A Dual-Channel GPS/Compass/Galileo/GLONASS Reconfigurable GNSS Receiver in 65nm CMOS," IEEE Custom Integrated Circuits Conference, San Jose, CA, Sep. 19-21, 2011, 4 pages.

Rivela et al., "A Low Power RF Front-End for L1/E1 GPS/Galileo and GLONASS Signals in CMOS 65nm Technology," International Conference on Localization and GNSS, Tampere, Finland, Jun. 29-30, 2011, 6 pages.

Rivela et al., "A Low Power RF Front-End for L1/E1 GPS/Galileo/GLONASS and BeiDou2 Signals in CMOS 65nm Technology," Position Location and Navigation Symposium, Monterey, CA, May 5-8, 2014, 7 pages.

STMicroelectronics, "Fully Integrated GPS/Galileo/Glonass/BeiDou/QZSS Receiver with embedded RF and in-package Flash," STA8089FG, data brief, Jan. 2014, 17 pages.

STMicroelectronics, "Fully Integrated GPS/Galileo/Glonass/BeiDou/QZSS Receiver with embedded RF and in-package Flash," STA8090FG, data brief, Apr. 2014, 21 pages.

STMicroelectronics, "Fully Integrated GPS/Galileo/Glonass/QZSS Receiver with embedded RF and in-package Flash," STA8088FG, data brief—preliminary data, Sep. 2013, 17 pages.

Tan et al., "A Universal GNSS (GPS/Galileo/Glonass/Beidou) SoC with a 0.25mm² Radio in 40nm CMOS," IEEE International Solid-State Circuits Conference, San Francisco, CA, Feb. 17-21, 2013, 3 pages.

Tan et al., "A Universal GNSS (GPS/Galileo/Glonass/Beidou) SoC with a 0.25mm² Radio in 40nm CMOS," Presentation for IEEE International Solid-State Circuits Conference, San Francisco, CA, Feb. 17-21, 2013, 6 pages.

u-blox AG, "u-blox M8 concurrent GNSS chips," UBX-M8030, 2013, 2 pages.

Chinese Search Report, mailed with the Chinese Office Action dated Jun. 20, 2017, for corresponding Chinese application No. 201510624934.7, 2 pages.

* cited by examiner

RECEIVER FOR RECEIVING A PLURALITY OF GNSS (GLOBAL NAVIGATION SATELLITE SYSTEM) SIGNALS

BACKGROUND

Technical Field

The present description relates to techniques for receiving Global

Navigation Satellite System (GNSS) signals according to multiple standards, comprising at least a first GNSS signal at a first frequency corresponding to a "Globalnaya Navigatsionnaya Sputnikovaya Sistema" (GLONASS) center frequency and a second GNSS signal at a second frequency corresponding to a "Běidǒu Wèixīng Dǎoháng Xìtǒng" (BeiDou) center frequency, said receiver comprising a mixer for mixing said plurality of GNSS signals with a local signal at a local frequency to generate a corresponding plurality of mixed signals and a low intermediate frequency section.

Various embodiments may apply, e.g., in GNSS receivers able to process al the GNSS signals in the L1 band (1550-1610 MHz).

Description of the Related Art

The Global Navigation Satellite System (GNSS) performs better when signals from many satellites are received concurrently: the maximum number of available satellites is reached when a receiver is compatible with all the existent GNSSs; which are the global positioning system (GPS) belonging to USA, the European Galileo, the Russian GLONASS, and the Chinese BeiDou2, in particular BeiDou2 B1I. For each GNSS service frequency band, among the other parameters, the RF receiver chain must endeavor also:

- a good out-of-band attenuation to cut off noise and to mitigate strong interfering tones, which may saturate the following ADC circuits;
- a good aliasing attenuation for a correct operation of the ADC;
- a good image rejection to avoid the degradation of signal-to-noise (SNR) ratio due to the overlapping of image band noise or, in worst case, of parasitic signals present in the same image band.

Normally, typical GNSS receivers are based on the Low Intermediate Frequency (Low-IF) architecture, demanding to the IF section, mainly to the IF Filter, the coverage of these three parameters.

Figure 1A:
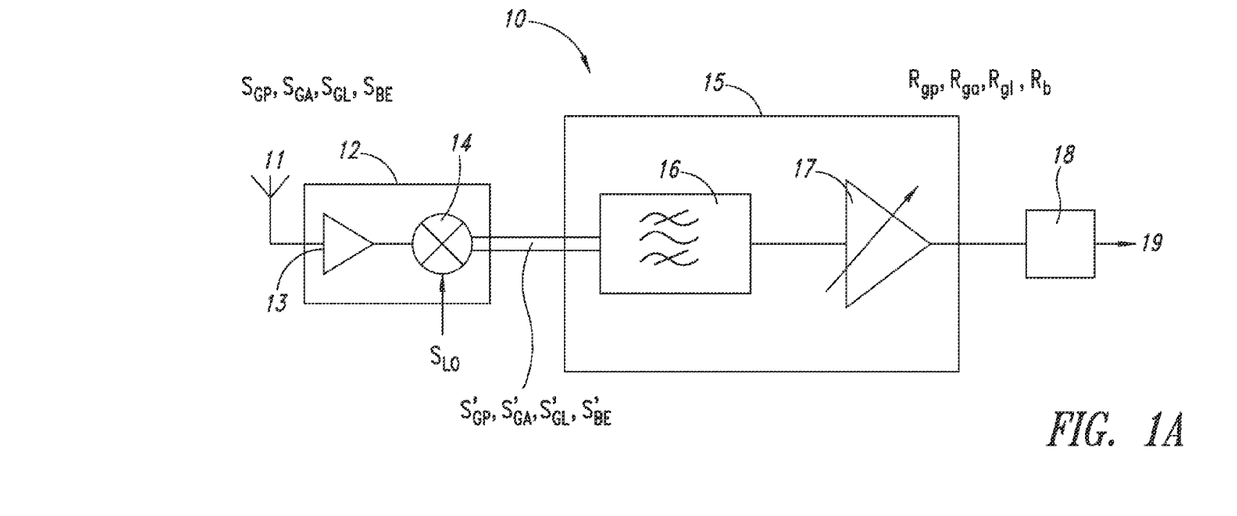
FIGS. 1A and 1B illustrate a single chain receiver and certain associated signals.
Figure 1B:
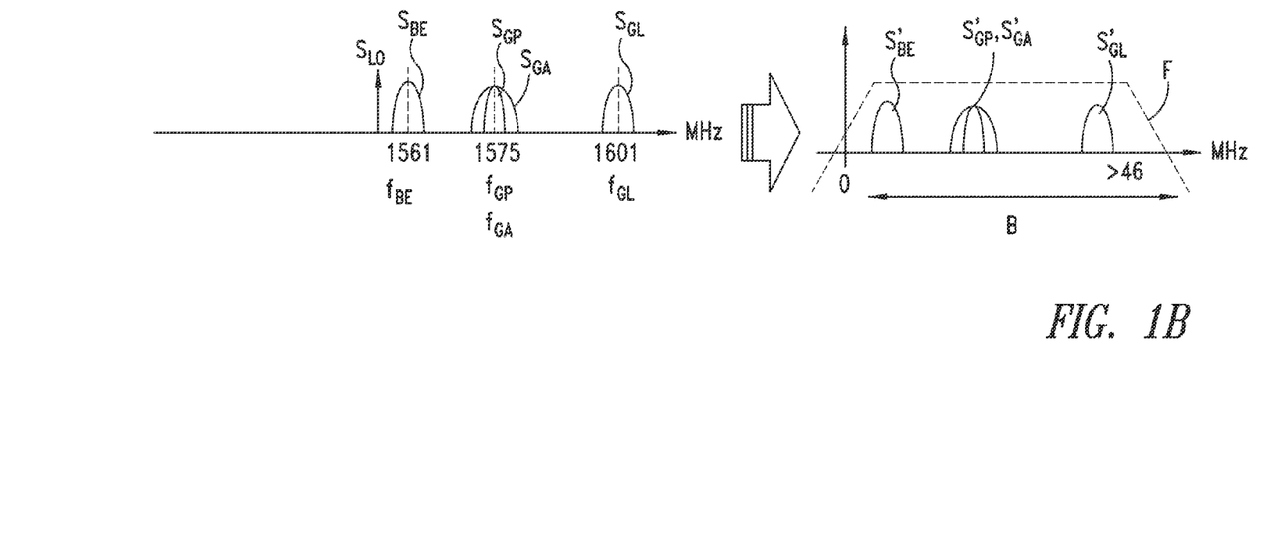

To this regard in FIG. 1A it is shown a single chain receiver 10, including a receiving antenna 11, which receives a plurality of GNSS signals including GPS signal $S_{GP}$, a Galileo signal $S_{GA}$, a GLONASS signal $S_{GL}$, a BeiDou2 signal $S_{BE}$, and delivers them to a radio frequency (RF) receiving section 12, including an amplifier 13 and a mixer 14, which mixes the incoming signals with a local oscillator signal $S_{LO}$ operating at a local frequency $f_{LO}$. Downstream the mixer 14 originates a plurality of corresponding mixed signals, i.e., a mixed GPS signal $S'_{GP}$, a mixed Galileo signal $S'_{GA}$, a mixed GLONASS signal $S'_{GL}$, a mixed BeiDou2 signal $S'_{BE}$, whose respective bands as the result of the sum and the difference with the local frequency $f_{LO}$, as known, are shifted in a main signal, i.e., the signal which is usually taken in account, and an image signal. To this regard, in FIG. 1B it is shown a diagram representing in the frequency domain the GNSS signals, specifically the band of the GPS signal $S_{GP}$ with a center frequency $f_{GP}$ at 1575 MHz, the band of the Galileo signal $S_{GA}$ with a center frequency $f_{GA}$ also at 1575 MHz, the band of the GLONASS signal $S_{GL}$ with a center frequency $f_{GL}$ at 1601 MHz, the band of the BeiDou2 signal $S_{BE}$ with a center frequency $f_{BE}$ at 1561 MHz. Also it is shown the local oscillator signal LO frequency $f_{LO}$. Also there are shown, in the right portion of FIG. 1B the main mixed signals $S'_{GP}$, $S'_{GA}$, $S'_{GL}$, $S'_{BE}$, downstream the mixer 14. The image signal, not shown, lies in the frequencies lower than zero because of the value of the local frequency $f_{LO}$. A low-IF section 15 receives the mixed GNSS signals $S'_{GP}$, $S'_{GA}$, $S'_{GL}$, $S'_{BE}$ generated by the mixer 14 and filters them through an IF filter 16, which has filter shape adapted to select the mixed GNSS signals $S'_{GP}$, $S'_{GA}$, $S'_{GL}$, $S'_{BE}$ as received signals $R_{GP}$, $R_{GA}$, $R_{GL}$, $R_{BE}$, after amplification by an AGC (Automatic Gain Control) circuit 17 comprised in the Low IF section 15. In particular, in the example shown in FIG. 1B the filter function F is a bandpass with a bandwidth B, between 0 and 46 MHz. The received GNSS signals $R_{GP}$, $R_{GA}$, $R_{GL}$, $R_{BE}$ are then fed to an ADC (Analog to Digital Converter) circuit 18, which output is then supplied to a digital section (not shown) for base band processing.

Indeed, although not shown in FIG. 1 for simplicity, the mixer 14 is of the type using two instances in quadrature, with 0° phase and 90° phase, of the local signal $S_{LO}$. Thus, as indicated by the two lines outputted by the mixer 14 in FIG. 1, the mixed signals generated by the mixer 14 include an in-phase signal and a quadrature signal. In the same way, filter 16 is indeed a complex filter, in order to operate on such quadrature signals. This approach is in any case known, for instance as quadrature down-conversion.

On the basis of what has just been discussed with reference to FIG. 1, since the GLONASS L1 band is about 8 MHz around 1601 MHz and the BeiDou2 L1 band is about 4 MHz around 1561 MHz, the difference between the two band centers is 40 MHz. The GPS and Galileo frequencies remain included between such previous two services. In the case of a receiver with a single chain for all services, such frequency difference results very stringent because the IF section applies a filter with at least 46 MHz of bandwidth B, this implying a high current consumption and a high silicon area occupation. Depending on the technology, this result may not even result be feasible.

Thus with a single chain, the concurrent reception may be difficult especially for GLONASS and BeiDou2, whose bands show the widest gap.

Other methods have been presented, for instance methods based on a unique zero-IF chain that delivers the output signal in complex format, are not able to perform the image rejection. Choosing a local oscillator operating at a frequency $f_{LO}$~1582 MHz, approximately in the middle of the four bands, the GLONASS service lies in the real part of the spectrum, with an upper frequency $f_{max}$~23 MHz; GPS, Galileo and BeiDou2 are received as image frequencies, with an upper frequency $f_{max}$~23 MHz, that is at the same frequencies of GLONASS, but with different phase. Thus, a base band digital processing is then necessary to correctly receive all four services.

Therefore this approach has the following drawbacks:

the 23 MHz low pass band filter may still be hard to obtain with conventional low cost silicon technology. Up to now, the known implementations have a low pass filter with 18 MHz band, which is not enough to receive concurrently all services. A high performance-high cost silicon technology may be necessary to accomplish such task;

more operations are left to the base band digital processing.

The RF receivers that are able to manage the GLONASS and BeiDou2 signals, and then all GNSS services, concurrently may typically use a multiple chain, that means the use of three branches with three mixers, three dedicated IF filter, three AGC circuits, and three ADC circuits. Although all these blocks are easily feasible also using a silicon technology with ordinary performances, since just about 6 MHz and 10 MHz are the upper frequencies of the filters, and the ADCs must run at lower sample frequencies than the previously described zero-IF solutions, the results are quite expensive in terms of hardware resources and of power consumption.

The subject matter discussed in the Background section is not necessarily prior art and should not be assumed to be prior art merely as a result of its discussion in the Background section. Along these lines, any recognition of problems in the prior art discussed in Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

An object of one or more embodiments is to provide a GNSS receiver that solves the drawbacks of the prior art and in particular to implement concurrent GPS, Galileo, GLONASS and BeiDou2 using a conventional low cost solution for certain ones of the blocks, feasible with a low cost silicon technology. The disclosure also describes a reduction of the hardware components, which saves silicon area and power consumption.

According to one or more embodiments, favorable results are achieved thanks to a receiver having the characteristics specified in the claims. One or more embodiments may refer to a corresponding method as well as to a computer program product that can be loaded into the memory of at least one computer and comprises parts of software code that are able to execute acts of the method when the product is run on at least one computer. As used herein, reference to such a computer program product is understood as being carried out with a non-transitory computer-readable medium or like means containing instructions for controlling the processing system in order to coordinate implementation of the method according to the embodiments. Reference to "at least one computer" is evidently intended to highlight the possibility of the present embodiments being implemented in modular and/or distributed form.

The claims form an integral part of the technical teaching provided herein in relation to the various embodiments.

According to the solution described herein, the receiver comprises a plurality of branches, a first branch for the GPS/Galileo signal and a second branch for the GLONASS, with a rejection filter and a second mixer operating at a second frequency to further shift the GLONASS signal before a further corresponding IF filtering. The receiver is configured to adjust the phase of the BeiDou2 signal at the output of the first mixer in order to be in-phase with the GLONASS signal and also to bypass the second mixer and so to connect directly to the input of the further IF filter, overlapping the bands of the BeiDou2 signal and of the GLONASS signal, so that the further IF filter, as well all the following blocks, can be shared.

In various embodiments, the by-pass branch of the receiver used to adjust the BeiDou2 signal phase is obtained by an elementary metal path interchange.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. The shapes of various elements and angles are not necessarily drawn to scale, and some of these elements are enlarged and positioned to improve drawing legibility. Further, the particular shapes of the elements as drawn are not intended to convey information regarding the actual shape of the particular elements and have instead been selected for ease of recognition in the drawings. One or more embodiments will now be described purely by way of a non-limiting example with reference to the annexed drawings, in which.

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment" that may be present in various points of the present description do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

Figure 2:
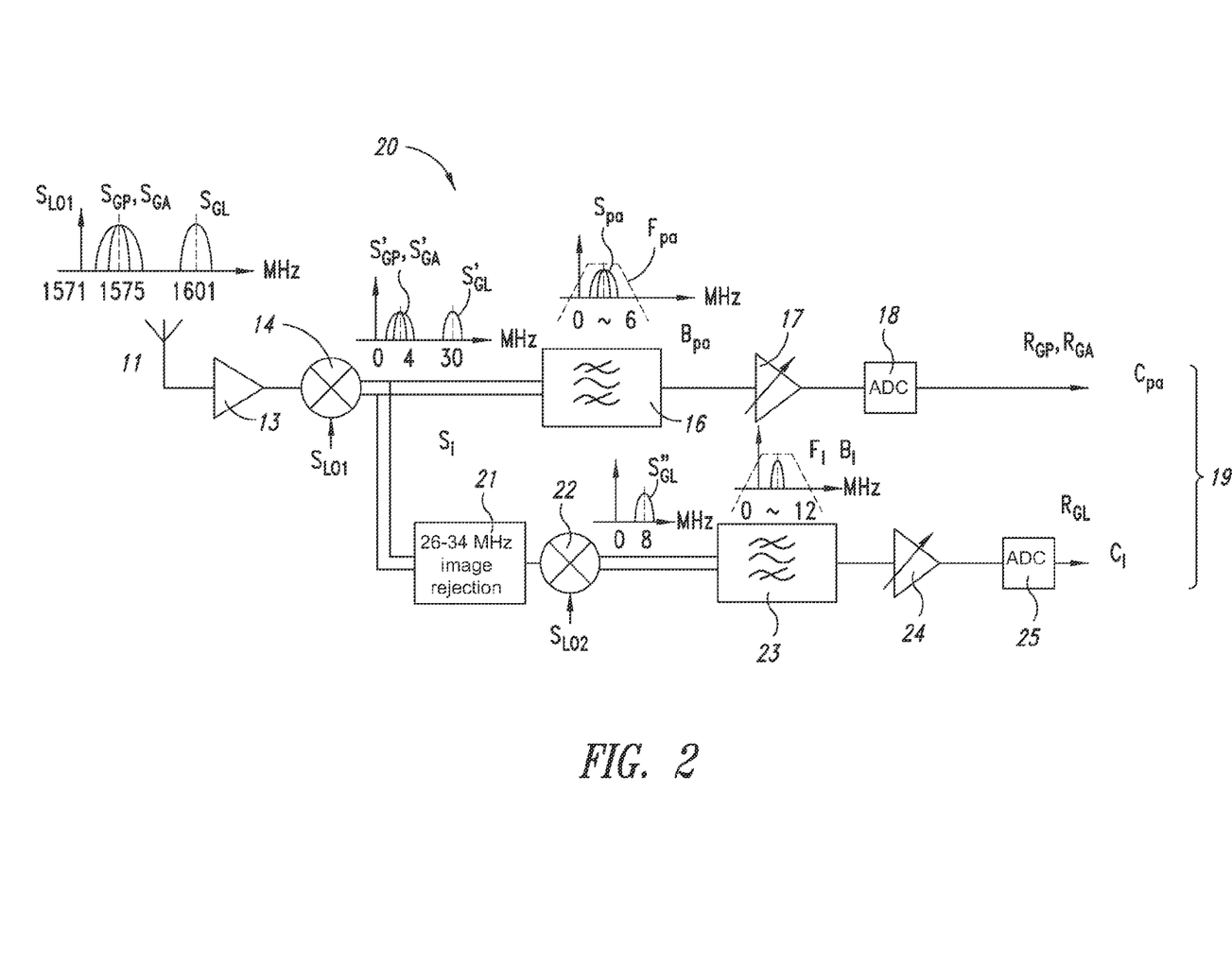
FIG. 2 represents a block diagram of a receiver for GLONASS, GPS and Galileo signals.

FIG. 2 shows an analog RF receiver 20 for multiple signals configured to receive GLONASS signals and, in addition, GPS/Galileo signals. This type of receiver it is known per se, for instance is a ST Teseo receiver.

The receiver 20 includes the antenna 11 to receive the GNSS signals, in this case the GPS signal $S_{GP}$, Galileo signal $S_{GA}$, GLONASS signal $S_{GL}$, and deliver them to the RF receiving section 12, including the amplifier 13 and a mixer 14, which mixes the incoming signals with a local oscillator signal $S_{LO1}$ having a first local frequency $f_{LO1}$.

The value of the first local frequency $f_{LO1}$ is 1571 MHz thus at the output of the mixer 14, as also shown in FIG. 2, the mixed GPS signal $S'_{GP}$ and the mixed Galileo signal $S'_{GA}$ lie around 4 MHz and the mixed GLONASS signal $S'_{GL}$ lies around 30 MHz. Such mixed signals are split between a first branch $C_{pa}$ for the GPS and Galileo services and a second branch $C_1$ for the GLONASS service, which stem in parallel downstream the mixer 14.

The first branch $C_{pa}$ includes, similarly to the single chain receiver of FIG. 1, an IF filter 16 with a filtering function $F_{pa}$ for GPS and Galileo services having a band between 0 and 6 MHz, and then an AGC 17 and an ADC 18 outputting the received GPS signal $R_{GP}$, Galileo signal $R_{GA}$ toward the digital section 19.

The second branch includes an image rejection filter 21, which is a polyphase filter operating between 26 and 34 MHz, followed by a further mixer 22, which mixes the incoming mixed GLONASS signal $S'_{GL}$ with a second local oscillator signal $S_{LO2}$ having a second local frequency $f_{LO2}$, which is preferably obtained by the first local frequency $f_{LO1}$ of 1571 MHz, dividing it by a given number, such as 72. This produces a remixed GLONASS signal $S''_{GL}$ at 8 MHz. Such remixed GLONASS signal $S''_{GL}$ is passed to a following IF filter 23, having a filtering function $F_1$ which is a pass-band with band $B_1$ between 4 and 12 MHz, and then to an AGC 24 and an ADC 25 outputting a receiver GLONASS signal $R_{GL}$ toward the digital section 19.

The receiver 20 is successful as GPS/Galileo receiver also able to receive the GLONASS signal for the market thanks to low cost solutions such as the GLONASS portion of the IF section with low maximum frequency (12 MHz), the reduced number of blocks, and the use of only one frequency synthesizer for both local oscillators.

Figure 3:
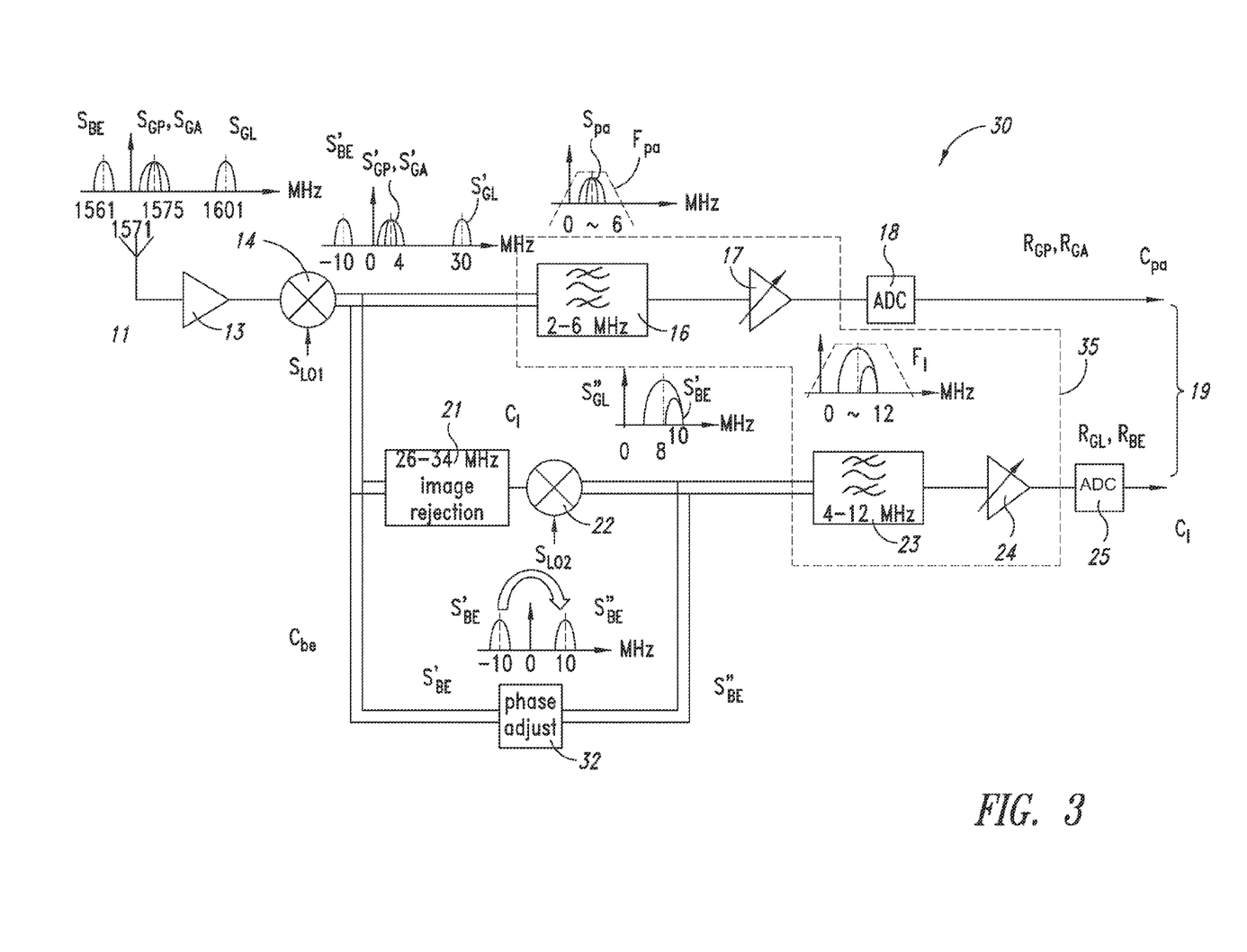
FIG. 3 represents a block diagram of a receiver for GLONASS, GPS and Galileo signals and BeiDou2 signals.

FIG. 3 shows an analog RF receiver 30 based on the architecture of receiver 20, adding a BeiDou2 signal $S_{BE}$ receiving capability. The blocks with the same reference numbers have the same functions/capability of the blocks already discussed with reference to FIG. 1 and FIG. 2.

Specifically, the receiver 30 with respect to receiver 20 includes a further by-pass branch $C_{be}$ and a phase adjust module 32, or phase shifter module.

Indeed, observing that, after the first mixer 14, the mixed BeiDou2 signal $S'_{BE}$ lies in the image band, around 10 MHz, such mixed BeiDou2 signal $S'_{BE}$ is supplied to the by-pass branch $C_{be}$, which departs downstream the mixer 14 and in parallel to GPS/Galileo and GLONASS branches $C_{pa}$ and $C_1$, while the phase adjust module 32 adjusts the phase of the mixed BeiDou2 signal $S'_{BE}$ in order to be in-phase with the remixed GLONASS signal $S''_{GL}$. Further, the by-pass branch $C_{be}$ is connected at its other end to the GLONASS branch $C_1$ downstream the second mixer 22, so as to bypass such second mixer 22 and so to connect directly to the input of the GLONASS 4-12 MHz IF filter 23: a phase adjusted BeiDou2 signal $S''_{BE}$, outputted by the phase adjust module 32, having a frequency band from about 8 MHz to about 12 MHz, is thus overlapped to the band of the remixed GLONASS signal $S''_{GL}$, so that the filter 23, as well all the following blocks, can be shared, i.e., the remixed GLONASS signal $S''_{GL}$ and the phase adjusted BeiDou2 signal $S''_{BE}$ can be filtered, in particular concurrently, with a same filter 23. Thus, such low IF filter 23 is configured to band pass also such adjusted BeiDou2 signal $S''_{BE}$ having a band overlapping the band of the remixed GLONASS signal $S''_{GL}$.

In this exemplary embodiment, the band of the phase adjusted BeiDou2 signal $S''_{BE}$ is contained within the band of the remixed GLONASS signal $S''_{GL}$, but the center frequency of the phase adjusted BeiDou2 signal $S''_{BE}$ is higher than the center frequency of the remixed GLONASS signal, although in other embodiments different choices of the receiver parameters, in particular of the local frequencies may lead to different values of such center frequencies, in particular the GLONASS and BeiDou2 frequencies before the IF filter 23 may coincide, although it is favorable that the BeiDou band lies within the GLONASS band so that the IF filter can manage both signals. The local frequencies are chosen to avoid managing frequencies too near to the zero frequency. The IF filter 23, the IF filter 16 and their AGC circuits 17, 24 form a Low IF section 35 of the receiver 30.

Figure 4A:
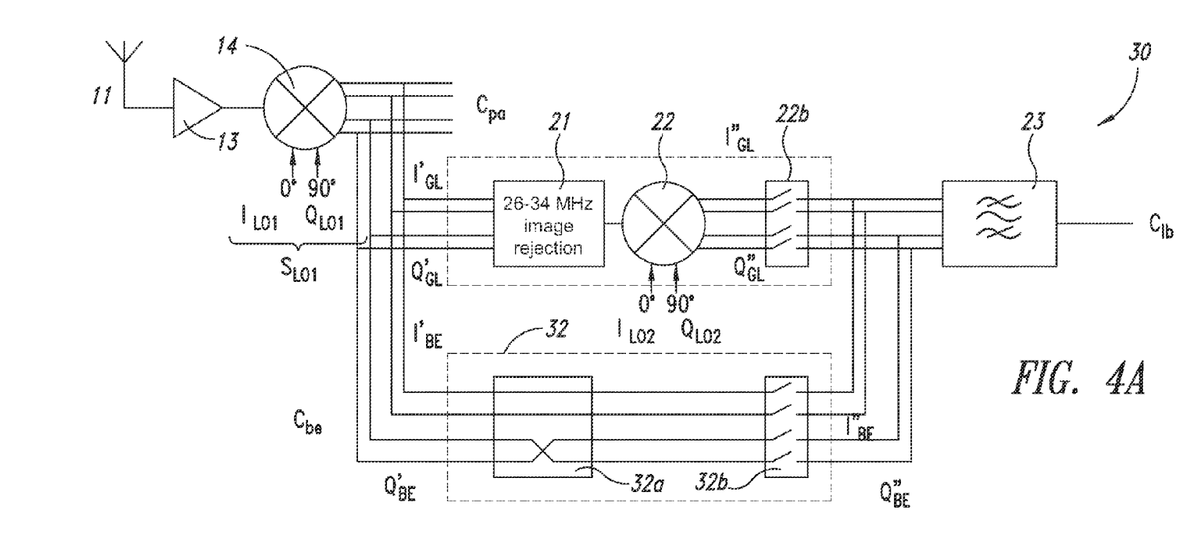
FIG. 4A represents schematically an embodiment of the receiver of FIG. 3.

In FIG. 4A an embodiment provides details of the by-pass branch $C_{be}$ and the operation of receiver 30. The mixer 14, as mentioned, receives two instances in quadrature, with 0° phase and 90° phase, of the local signal, $I_{LO1}$ and $Q_{LO1}$, of the local signal $S_{LO1}$ and generates a complex signal with an in-phase signal part and a quadrature signal part, thus also an in-phase mixed BeiDou2 signal $I'_{BE}$ and a quadrature mixed BeiDou2 signal $Q'_{BE}$. In the following also the in-phase and quadrature parts of the other signals, indicated with the letter 'S', originated by quadrature down-conversion, will be indicated with the letter 'I' for the in-phase part and 'Q' for the quadrature part, i.e., $I'_{GL}$, $Q'_{GL}$, $I''_{GL}$ $Q''_{GL}$ for GLONASS while also the second local oscillator signals has quadrature signals $I_{LO2}$ and $Q_{LO2}$.

Module 32 adjusts the BeiDou2 signal phase using an elementary metal path interchange: a 180° rotation of the in-quadrature part $Q'_{BE}$ of the complex signal in the by-pass branch $C_{be}$ gives the required phase rotation to be in phase with the remixed GLONASS signal $S''_{GL}$.

Figure 4B:
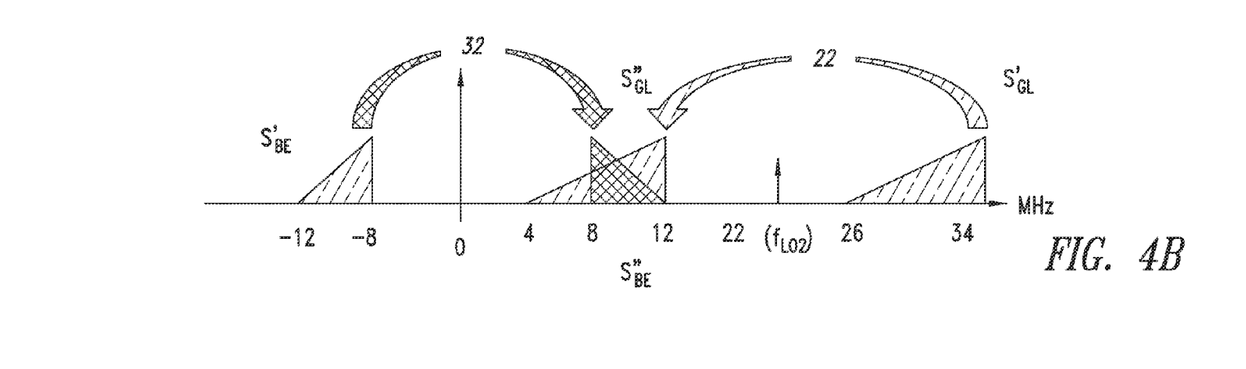
FIG. 4B represents a diagram of signals in the receiver of FIG. 4A.

FIG. 4B shows the adjusted BeiDou2 signal $S''_{BE}$ and the remixed GLONASS signal $S''_{GL}$ at the input of the IF filter 23. For the effect of the phase adjust module 32, the mixed BeiDou2 signal $S'_{BE}$ at input is swapped from the image part at 8-12 MHz, whereas the mixed GLONASS signal $S'_{GL}$ is displaced by the further mixer 22, with frequency $f_{LO2}$ at 22 MHz, to the band between 4 and 12 MHz in correspondence of the adjusted BeiDou2 signal $S''_{BE}$.

Figure 5:
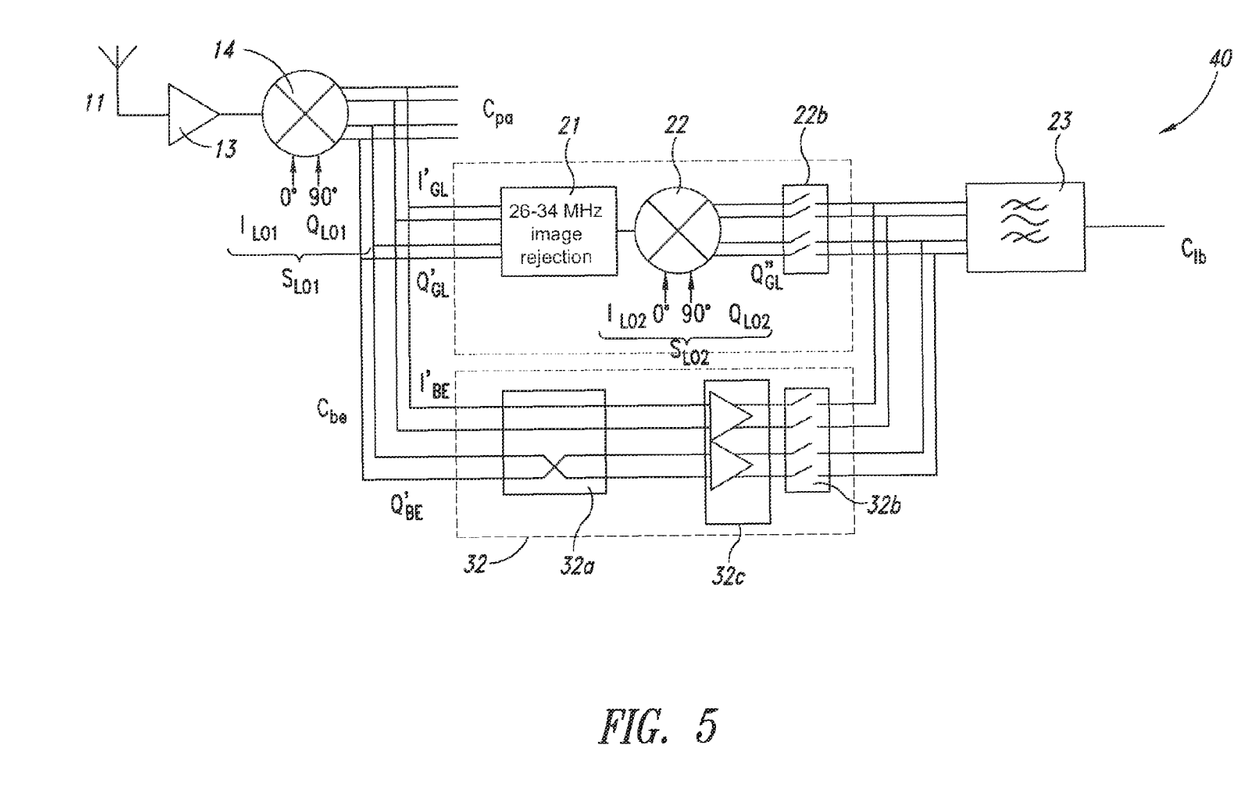
FIG. 5 represents schematically a further embodiment of the receiver of FIG. 3.

FIG. 5 shows an embodiment 40 of the receiver which includes further features which improve the operation by adding an attenuation/amplification stage 32c in the by-pass branch $C_{be}$. This may be useful to:

equalize BeiDou2 signal amplitude with respect to the GLONASS signal at the input of the IF filter 23, which may depend on the gain of 26-34 MHz image rejection filter 21 plus the second mixer 22 gain in the GLONASS branch $C_1$; and add reverse isolation in the BeiDou2 branch $C_{be}$.

As shown in FIGS. 4A and 5, both the embodiments include switches 22b on the GLONASS branch $C_1$, downstream the second mixer 22, and switches 32b on the bypass $C_{be}$, preferably placed just before the connection with the GLONASS branch $C_1$, which can be controlled by a suitable control module to configure different operative modes (receiving GPS/Galileo/GLONASS only, GPS/Galileo/BeiDou2 only, GPS/Galileo/GLONASS/BeiDou2) of the receiver. This avoids the use of adjustable IF filters or other more complicated techniques.

In the following discussion, parameters and implementation details of an embodiment on a chip of a receiver according to FIG. 5 will be discussed.

The chip contains similar modules to those shown in FIG. 3 and FIG. 5, with the addition of a PLL frequency synthesizer receiving externally with respect to the chip a crystal oscillator signal and a TCXO (Temperature Compensated Crystal Oscillator) signal to generate the local oscillator signals $S_{LO1}$, $S_{LO2}$. The chip also includes a SPI (Serial Parallel Interface) to receive commands to set the operation of the receiver, as mentioned in the following, and further standard circuits such as a LDO (Low Drop Out regulator).

In an embodiment the receiver can use the following parameters:

RF frequency ($f_{LO1}$) 1.571328 GHz
2nd local oscillator frequency ($f_{LO2}$) 21.824 MHz
Central IF for GPS/GAL filter 16 4.092 MHz
Central IF for GLONASS filter 23 8.566 MHz
Central IF for BeiDou2 B1I $S'_{BE}$ 10.23 MHz
Gain range (dB) 50
−1 dB IF filter Bandwidth GPS mode (Galileo mode) 2 MHz (4 MHz)
−1 dB GLONASS IF Bandwidth 8 MHz
−1 dB BeiDou2 IF Bandwidth 4.092 MHz
IRR (Min.) 20 dB
Min Out-of-band rejection GPS (@12 MHz) 20 dB
Min Out-of-band rejection Galileo (@28 MHz) 20 dB
Min Out-of-band rejection (for GLONASS and B1I) (@51 MHz) 20 dB
Max current consumption 20 mA
Group delay variation for IF filter:
GAL±30 ns
GLO/B1I±10 ns
NF with internal LNA<3 dB
External Supply Voltage 1.2V
Output quantization bits 3

As mentioned in describing FIGS. 3 and 5, one chosen architecture for GPS/Galileo signals (branch $C_{pa}$) is a single down-conversion low-IF with IF frequency of 4f0 (f0=1.023 MHz). For GLONASS signals (branch $C_1$) the architecture is a double down-conversion low-IF, sharing with the GPS/Galileo path the first down-conversion mixer, with final IF frequency of roughly 8.566 MHz. For the BeiDou2 B1I signal (by-pass branch $C_{be}$) the architecture is again a single down-conversion using the image at roughly 10f0 obtained after the first mixer 14 with $f_{LO1}$ at 1571.328 MHz.

The embodiment here detailed operates with the following frequency bands for the GNSS signals:

$S_{GL}$ 1597.552-1605.886 MHz
$S_{GA}$ 1573.374-1577.466 MHz;
$S_{GP}$ 1574.397-1576.443 MHz
$S_{BE}$ 1559.052-1563.144 MHz

The frequency $f_{LO1}$ of the first local oscillator $S_{LO1}$, in general around 1571 MHz is chosen specifically at 1571.328 MHz in this non-limiting embodiment. The oscillator frequency can have a variation within a theoretical upper range of 200 MHz, although the variation is usually kept within 20 MHz for the current GNSS signals of the L1 band.

All the needed frequencies are generated by a fully embedded PLL. Sampling frequency for all the processed signals is 64f0. Amplifier 13 is a two-stage LNA (Low Noise Amplifier) including an LNA stage and an RFA (Radio Frequency Amplifier) stage. The GNSS signals coming from the antenna 11 and an external pre-selection filter are amplified by the two-stages LNA embedded in the chip. It needs external input matching and DC decoupling to achieve a favorable trade-off between gain and noise figure (NF). Each stage is based on a cascode single-ended configuration for good isolation characteristics and low power consumption. The first mixer 14 as mentioned uses quadrature input achieving image rejection ratio (IRR) better than 20 dB together with the IF filters that follow.

The GPS/Galileo branch $C_{pa}$ presents a filter 16 which is a band-pass complex IF filter centered at 4f0 and 1 dB-bandwidth of 2 MHz for GPS-only configuration and 4 MHz for Galileo configuration. After the IF filter 16 there are a variable gain amplifier (VGA) with the AGC 17 and ADC 18 circuits.

The GLONASS branch $C_1$, as mentioned, can be configured for either BeiDou2, specifically BeiDou2 B1I, or GLONASS signals or for both signals at the same time according to a selection bit, which operates, as mentioned in the following, on a selector which embodies switches 22*b* and 32*b*.

The AGC and ADC circuit on both chains $C_1$ and $C_{pa}$ share the same configuration with minor adjustments for the wider bandwidth of GLONASS ensemble signal.

In the branch $C_{pa}$, complex IF filtering has been chosen for its asymmetrical transferring function, providing good rejection of out-of-band and image signals. It is based on decoupled first-order cells cascaded to get the final band-pass filter order. It is characterized by two operative modes: the first one for GPS/Galileo signals based on a fourth order configuration; the second for GPS signal-only based on a third-order configuration. It is obtained switching off and by-passing the "extra" stage for Galileo, and adjusting the response of the three other stages, saving some current in GPS only case. Each single stage band-pass filter response is a frequency-shifted version of a low-pass Butterworth filter type. Its design uses operational trans-conductor amplifiers and capacitors (gm-C or OTA-C). Each filter stage shares the same bandwidth centered on different frequencies symmetrically placed around the IF at 4f0 in order to achieve wider bandwidth maintaining a low-order IF filter with good rejection for both out-of-band and image signals.

The AGC circuit 17 is a VGA driven digital AGC circuit which has a gain range of 50 dB to amplify the incoming signal and assure a proper level at ADC input. The AGC controls signal amplitude to avoid (or limit) ADC saturation ensuring an efficient use of its dynamic range. It is based on indirect power estimation through measurement of threshold-crossing rate of the received signal. This method measures how many times the signal exceeds a threshold and then deduces its power, tacking the right action for driving the VGA. The threshold has been defined assuming AWGN distribution of received signal because GNSS signals are buried in the noise at ADC input. The AGC adjusts the gain integrating digitally a Mag1 bit by a digital circuit. It fixes the Mag1 bit duty cycle in a range (e.g., from 26% to 40%) set by the base-band (BB) through a SPI (Serial Parallel Interface) with which the receiver is equipped. To minimize quantization losses a 3-bit ADC is used. It converts the IF signal into Sign bit (MSB) and two magnitude bits Mag1 and Mag0 (LSB).

The local oscillator signals are supplied by a frequency synthesizer which is an N/R programmable integer PLL, accommodating commonly used TCXO frequencies (from 10 to 52 MHz). The synthesizer embeds a VCO working at 3.142 GHz, a divider by 2 generates two LO signals (I and Q) at the selected frequency for the first image rejection mixer. From this LO, through off loop dividers, the LO signals for the second mixer, the sampling, and the baseband clocks are also obtained.

For what regards the GLONASS branch, or chain, $C_1$, the IF chain diverting from first mixer 14 (I and Q format) presents, as mentioned, a poly-phase filter (module 21) for image frequency rejection with respect to the GLONASS bandwidth, which in the mixed signal is now centered at roughly 30 MHz. After this filter, the further mixer 22 with SLO2 signals at 21.824 MHz provides the final down-conversion of the GLONASS band in the range from 4.655 MHz to 12.4785 MHz. After the further mixer 22, the signal enters in a selector, which encompass both switches 22*b* and 32*b*, that allows either GLONASS signal or BeiDou2 signal or both signals to pass to the next IF filter 23. For BeiDou2 signal, as image in the range from 8.184 MHz to 12.276 MHz, the IF chain diverting from the first mixer 14 presents a shifter block composed by a phase inversion performed, as already discussed, through an elementary net interchange, overlapping down-converted BeiDou2 signal on the down-converted GLONASS bandwidth with coherent phase, so that the same IF filter can be shared. This block includes also an amplifier, i.e., amplifier 32c, that balances the gain with the GLONASS chain. The shifter output enters in the selector comprising also switches 32b and then the signal is passed to the IF filter 23.

The GLONASS/BeiDou IF filter provides a low current consumption, roughly 2 mA, and to save silicon area, with the following parameters:

| | |
|---|---|
| Gain (dB) | 1.2 |
| 1 dB bandwidth (MHz) | 14.1 |
| Attenuation (dB) | |
| @32 MHz | 17.6 |
| @51.5 MHz | 30.5 |
| @112 MHz | 51 |
| Image rejection (dB) @8.56 MHz | 25 |
| Group delay variation in [4.65-12.48 MHz] (ns) | 18.1 |
| V1 dB (mV) | 179 |

This has been possible due also to the high sampling frequency in the receiver, 64f0, lessening the specification of the IF filter especially for out-of-band rejection and anti-alias function; on the other hand image rejection requirement remained unchanged and stringent. Then, for performance optimization, this IF filter has been split in two parts: the first one performs the image rejection through a passive complex filter (polyphase); the second part is an active real 3rd order Chebychev-I filter that gives the required out-of-band attenuation, acting also as anti-alias filter for the ADC sampling process. In particular this filter incorporates four buffers to perform an impedance matching, with unitary gain, to properly drive the polyphase filter that immediately follows. The polyphase filter consists of three stages, each one centered at a different frequency to obtain a wider frequency range of image rejection. In particular, the first stage is centered at 10.5 MHz, the second at 7.1 MHz and the third at 4.5 MHz, obtaining a frequency range of roughly 11 MHz with an image rejection better than 30 dB in post-layout simulations.

Buffer and polyphase determinates 3.5 dB of loss for in-band signals. After the polyphase filter, the adder combines in-phase signal with the in-quadrature signal in order to obtain a real signal with appropriate image rejection. It provides 3.3 dB of gain, and at its input has a "zero" which at 2.6 MHz attenuates 1 dB.

The adder is the block that limits the signal swing of the filter chain, because in simulation presents V1 dB similar to that of the whole filter (roughly 179 mV). The last block is the active low pass real 3rd order Chebychev I filter with gain of 1.5 dB, upper frequency corner at 15.1 MHz (considering −1 dB point) and in-band ripple of 0.1 dB.

As for the GPS chain, the IF filter on the GLONASS chain is followed by a VGA with its AGC loop and 3-bit ADC. The topology of these blocks is the same as described above for the GPS chain with modifications for the wider GLONASS bandwidth centered on the different IF frequency.

The solution according to the various embodiments here described provides the following advantages.

The receiver according to the various embodiments here described is advantageous since all parts of such receiver are feasible by conventional design techniques and low cost solutions.

The receiver according to the various embodiments here described is also advantageous since the BeiDou2 concurrent service can be added practically without adding more blocks or circuits and without occupying more silicon area or consuming more power compared to the solution already used for GPS/Galileo/GLONASS. In some embodiments, only metal paths have to be added.

The receiver according to the various embodiments here described is also advantageous since the switches, usable as option, provide flexibility in the in order to configure different operative modes (GPS/Galileo/GLONASS only, GPS/Galileo/BeiDou2 only, GPS/Galileo/GLONASS/BeiDou2), avoiding the use of adjustable IF filters or other more complicated techniques.

The receiver according to the various embodiments here described is also advantageous since it performs all the required tasks, including the image rejection, concurrently for each of the four services, delivering four real signals to the base band digital part with good signal to noise ratio.

Of course, without prejudice to the principle of the embodiments, the details of construction and the embodiments may vary widely with respect to what has been described and illustrated herein purely by way of example, without thereby departing from the scope of the present embodiments, as defined in the ensuing claims.

Although the receiver has been described as receiver capable to receive all the L1 band signal, GLONASS, BeiDou2, GPS and Galileo it is clear that in various embodiments the receiver can be configured without the branch for the Galileo and GPS signals, operating as a receiver for the sole GLONASS and BeiDou2 services, i.e., as a receiver for receiving a first GNSS signal at a first frequency corresponding to a GLONASS center frequency and a second GNSS signal at a second frequency corresponding to a BeiDou2 center frequency, the receiver comprising a mixer for mixing such two GNSS signals with a local signal at a local frequency to generate corresponding mixed signals, comprising a first GLONASS mixed signal and a second BeiDou2 mixed signal, two branches for handling said mixed signals being connected in parallel downstream said mixer, and a low IF section, said two branches including the branch for the reception of the first GLONASS signal and the bypass branch connected at one end upstream the rejection module and at the other end downstream the second mixer in said GLONASS branch.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A receiver arranged to receive a plurality of Global Navigation Satellite System (GNSS) signals of different types, each type of said plurality of GNSS signals arranged according to a different global navigation standard, said receiver comprising:
   a radio frequency (RF) section, said radio frequency section including:

at least one mixer arranged to receive said plurality of GNSS signals and arranged to receive at least one local frequency signal, said at least one mixer further arranged to generate a plurality of mixed signals, each of the plurality of mixed signals corresponding to one of the plurality of GNSS signals, the plurality of mixed signals including at least a first mixed signal derived from a first GNSS signal of a first type and a second mixed signal derived from a second GNSS signal of a second type; and a low intermediate frequency (IF) section electrically coupled to said at least one mixer, said low IF section including:
    a plurality of branches configured to process said plurality of mixed signals, said plurality of branches electrically coupled in parallel downstream of said at least one mixer, said plurality of branches including:
        a first branch to process said first mixed signal, said first branch including an image rejection filter and at least one second mixer, said image rejection filter configured to reject an image signal of the first mixed signal and said at least one second mixer configured to mix an output signal from said image rejection filter with a second local frequency signal to derive a first remixed signal; and
        a bypass branch electrically coupled upstream said image rejection filter and downstream said at least one second mixer, said bypass branch including an adjustment module configured to adjust said second mixed signal to overlap a band of an adjusted second mixed signal with a band of said first remixed signal; and
    a low IF filter electrically coupled downstream said bypass branch and said at least one second mixer, said low IF filter configured to band pass filter said first remixed signal and said adjusted second mixed signal.

2. The receiver according to claim 1, wherein said first type of GNSS signal corresponds to a Globalnaya Navigatsionnaya Sputnikovaya Sistema (GLONASS) center frequency and a second GNSS signal corresponds to a Běidǒu Wèixīng Dǎoháng Xìtǒng (BeiDou) center frequency.

3. The receiver according to claim 1, wherein said at least one local frequency signal has a frequency of about 1571 MHz, wherein said low IF filter has a band between about 4 MHz and about 12 MHz, and wherein said adjustment module is configured to perform a 180 degrees phase adjustment of a quadrature component of said second mixed signal.

4. The receiver according to claim 1, wherein the adjustment module comprises an elementary metal path interchange.

5. The receiver according to claim 4, wherein said plurality of GNSS signals includes a third GNSS signal of a third type, wherein said third type of GNSS signal corresponds to a Global Positioning System (GPS) center frequency, wherein said at least one mixer is further arranged to generate at least a third mixed signal of said third type, and wherein said plurality of branches includes a third branch to process said third mixed signal, said third branch including a second low IF filter configured to band pass said third mixed signal.

6. The receiver according to claim 5, wherein said plurality of GNSS signals includes a fourth GNSS signal of a fourth type, wherein said fourth type of GNSS signal corresponds to a Galileo center frequency.

7. The receiver according to claim 5, wherein said second low IF filter is configured to pass signals between about 2 MHz and about 6 MHz.

8. The receiver according to claim 1, wherein said bypass branch comprises:
    an attenuation/amplification stage.

9. The receiver according to claim 1, comprising:
    one or more switches positioned within at least one of the plurality of branches, said one or more switches controllable to select different modes of the receiver.

10. A method to process a plurality of received Global Navigation Satellite System (GNSS) signals of different types, each type of said plurality of received GNSS signals arranged according to a different global navigation standard, said method comprising:
    mixing said plurality of received GNSS signals with a local frequency signal to generate a plurality of mixed signals, each of the plurality of mixed signals corresponding to one of the plurality of received GNSS signals, the plurality of mixed signals including at least a first mixed signal derived from a first GNSS signal of a first type and a second mixed signal derived from a second GNSS signal of a second type;
    processing in parallel through a plurality of branches said mixed signals, said processing including:
        in a first branch of said plurality of branches, rejecting an image signal of the first mixed signal with an image rejection filter;
        in the first branch, mixing an output signal from the image rejection filter with a second local frequency signal to derive a first remixed signal; and
        in a bypass branch, adjusting said second mixed signal to overlap a band of an adjusted second mixed signal with a band of said first remixed signal; and
    concurrently band pass filtering with a low IF filter said adjusted second signal and said first remixed signal.

11. The method according to claim 10, wherein said first type of GNSS signal corresponds to a Globalnaya navigatsionnaya sputnikovaya sistema (GLONASS) center frequency and a second GNSS signal corresponds to a Běidǒu Wèixīng Dǎoháng Xìtǒng (BeiDou) center frequency.

12. The method according to claim 10, wherein said first local frequency signal is about 1571 MHz, wherein said low IF filter has a band between about 4 MHz and about 12 MHz, and said adjusting said second mixed signal includes performing a 180 degrees phase adjustment of a quadrature component of said second mixed signal.

13. The method according to claim 10, comprising:
    generating, via said act of mixing said plurality of received GNSS signals with said local frequency signal, a third GNSS signal of a third type as a third mixed signal of the plurality of mixed signals, wherein said third type of GNSS signal corresponds to a Global Positioning System (GPS) center frequency; and
    performing in parallel with said processing in parallel, a low IF filtering to band pass said third mixed signal.

14. The method according to claim 10 wherein said plurality of GNSS signals includes a fourth GNSS signal of a fourth type, wherein said fourth type corresponds to a Galileo center frequency.

15. The method according to claim 10, wherein said band pass filtering with the low IF filter is configured to pass signals between about 2 MHz and about 6 MHz.

16. The method according to claim 12, comprising:
    deriving said second local frequency signal by dividing said first local frequency signal by 72.

17. A non-transitory computer-readable medium containing instructions to execute a method that controls a processing system, said method comprising:
- enabling processing of Global Navigation Satellite System (GNSS) signals from up to four different satellite navigation systems, said four different satellite navigation systems including a Globalnaya navigatsionnaya sputnikovaya sistema (GLONASS) satellite system, a Běidǒu Wèixīng Dǎoháng Xìtǒng (BeiDou) satellite system, a Global Position System (GPS) satellite system, and a Galileo satellite system, said processing including:
- mixing received GNSS signals with a first local frequency signal to generate a plurality of mixed signals;
- transforming a first portion of said mixed signals in a first parallel branch, said transforming said first portion of said mixed signals including:
  - filtering said first portion of said mixed signals through a band-pass filter having a bandwidth between about 0 MHz and 46 MHz; and
  - amplifying said filtered first portion of said mixed signals with an automatic gain control (AGC) circuit;
- transforming a second portion of said mixed signals in a second parallel branch, said transforming said second portion of said mixed signals including:
  - rejecting image signals of said second portion of said mixed signals with an image rejection filter; and
  - mixing output signals from said image rejection filter with a second local frequency signal to derive first remixed signals;
- transforming a third portion of said mixed signals in a third parallel branch, said transforming said third portion of said mixed signals including:
  - adjusting a phase of said third portion of said mixed signals to overlap a band of said first remixed signals; and
  - concurrently band pass filtering with a low IF filter said adjusted third portion of said mixed signals and said first remixed signals.

18. The non-transitory computer-readable medium containing instructions to execute the method that controls the processing system of claim 17, said method comprising:
- amplifying with a low noise amplifier said GNSS signals prior to mixing said GNSS signals.

19. The non-transitory computer-readable medium containing instructions to execute the method that controls the processing system of claim 17, said method comprising:
- converting said transformed first portion of said mixed signals with a first analog to digital converter.

20. The non-transitory computer-readable medium containing instructions to execute the method that controls the processing system of claim 19, said method comprising:
- converting said concurrently band pass filtered adjusted third portion of said mixed signals with a second analog to digital converter; and
- converting said concurrently band pass filtered first remixed signals with said second analog to digital converter.

* * * * *